United States Patent [19]

Jacobsen et al.

[11] Patent Number: 4,641,536
[45] Date of Patent: Feb. 10, 1987

[54] ELECTROMAGNETIC FLOW METER

[75] Inventors: Hans E. Jacobsen; Henning M. Hansen, both of Nordborg; John Nyrup, Sønderborg; Henry Hansen, Gråsten; Konstantin Lassithiotakis, Nordborg, all of Denmark

[73] Assignee: Danfoss A/S, Nordborg, Denmark

[21] Appl. No.: 744,230

[22] Filed: Jun. 13, 1985

[30] Foreign Application Priority Data

Jun. 29, 1984 [DE] Fed. Rep. of Germany ....... 3423921

[51] Int. Cl.⁴ .............................................. G01F 1/38
[52] U.S. Cl. ................................................ 73/861.12
[58] Field of Search ............ 73/861.12, 861.15, 861.16

[56] References Cited

U.S. PATENT DOCUMENTS

| | | | |
|---|---|---|---|
| 3,334,518 | 8/1967 | Miyamichi | 73/861.12 |
| 3,695,104 | 10/1972 | Mannherz et al. | 73/861.12 |
| 3,750,460 | 8/1973 | Grauer | 73/861.12 |
| 3,824,856 | 7/1974 | Yard | 73/861.12 |
| 3,924,466 | 12/1975 | Medlar | 73/861.12 |
| 4,507,975 | 9/1985 | Bittner et al. | 73/861.12 |

Primary Examiner—Herbert Goldstein
Attorney, Agent, or Firm—Wayne B. Easton

[57] ABSTRACT

In an electromagnetic flow meter having a ceramic measuring tube, a housing arrangement is provided which forms a fluid tight capsule surrounding the measuring tube to prevent the escape of fluid if the tube should happen to crack or break in the use thereof.

2 Claims, 1 Drawing Figure

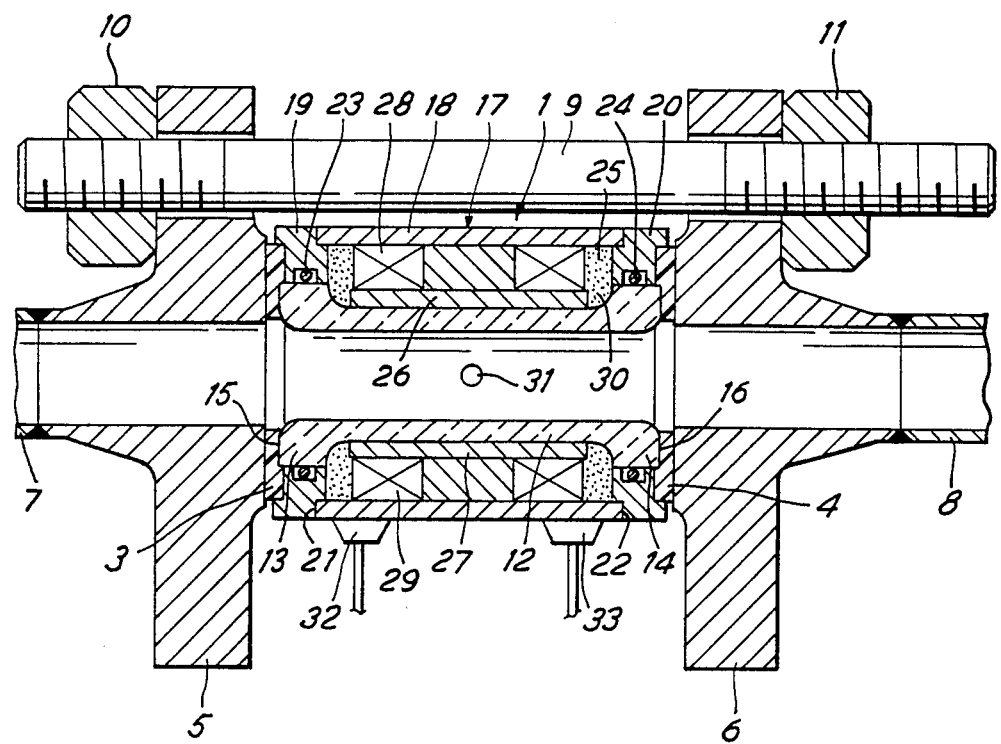

ELECTROMAGNETIC FLOW METER

The invention relates to an electromagnetic flow meter with a pressure resistant ceramic measuring tube and a housing surrounding same to leave a hollow space between them in which there are the pole shoes and coil arrangement of a magnet system, sealing faces for the abutment of sealing ring discs being provided at both ends.

In a known flow meter of this kind (EU-OS 80 535), the measuring tube is of an oxide ceramic so that it will also be suitable for aggresive and hot media. The measuring tube has such a high mechanical strength that it is not necessary to provide a metal covering which extends over the entire length and increases the pressure and bending resistance (as in the case of the construction of U.S. Pat. No. 3750468). Consequently, the pole shoes and coil arrangement can be arranged directly beyond the ceramic measuring tube and the metal housing can be used as the magnetic return path. To form an adequately large sealing surface, the metal tube has a flange at both ends to resemble the shape of a yarn bobbin. The peripheral faces of these flanges are held in a complementary bore of the housing and can be secured therein by means of shrinkage stresses. Ceramic materials are highly sensitive to impact and percussion loads, pressure peaks in the flowing medium, rapid temperature fluctuations etc. If the ceramic measuring tube breaks, the flow medium can escape over the entire housing. This can cause extensive damage, especially in the case of aggressive liquids.

The invention is based on the problem of providing an electromagnetic flow meter of the aforementioned kind that is pressure tight despite using a ceramic measuring tube.

This problem is solved according to the invention in that the housing forms a pressure tight capsule of at least the same pressure resistance as the measuring tube and its end faces form the outer part of the sealing face.

In this construction, no measures are taken to strengthen the ceramic measuring tube. Instead, the measuring tube is enclosed in a pressure tight chamber. For this purpose, it is necessary on the one hand for the housing to have an adequate pressure resistance and on the other hand not only the measuring tube but also the housing should be sealed at the ends from connecting conduits. If the measuring tube should now break as a result of exceptional stresses, the flow medium can simply flow into the hollow space between the measuring tube and the housing but not reach the outside. Consequently even aggressive media cannot cause damage. Also, the housing need generally have only a limited resistance to the flow medium. This is because a break in the measuring tube is found relatively easily, for example through a change in the measuring signal, so that replacement of the flow meter is readily possible within the service life of the housing material.

Preferably, the housing has two flanges projecting inwardly up to the zone of the sealing face. This not only gives the desired seal between the housing and connecting conduits but also leads to the measuring tube having no, or no marked, outer flanges at its ends. This considerably improves the production and strength of the ceramic body.

Preferably, the housing is formed from a tube and two flanges. These three parts can be readily sealingly interconnected and provide a very strong housing. This housing has a comparatively small external diameter so that it can be readily accommodated within the clamping screws that interconnect the connecting conduits and the spacing of which from the central axis is standardised. In a preferred embodiment, the outer part of the sealing face and the inner part of the sealing face formed by the end face of the measuring tube have substantially the same radial width. As a result, the end of the housing provides a seal of the same quality as the end of the measuring tube.

It is advisable for the inner part of the sealing face formed by the end face of the measuring tube to project somewhat axially beyond the outer part of the sealing face. This results in the main seal during normal operation being provided between the end of the measuring tube and the connecting conduits.

Desirably, a circumferential seal is provided between the housing and measuring tube at each end. It has been found that ceramic measuring tubes break intermediate their ends so that the flow medium first penetrates the hollow space of the housing. The circumferential seal is in series with the outer sealing portion at the end so that the hollow space is particularly tightly sealed.

Further, the electric terminals for the coil arrangement and for the electrodes should be led out of the housing through pressure tight fittings.

Another way of increasing the pressure tightness and possibly dispensing with pressure tight fittings is for the free zone of the hollow space to be filled with a sealing mass.

A preferred example of the invention will now be described in more detail with reference to the drawing in which the single FIGURE shows a longitudinal section through an electromagnetic flow meter according to the invention.

An electromagnetic flow meter 1 is clamped between the flanges 5 and 6 of two connecting conduits 7 and 8 with the interpositioning of two sealing ring discs 3 and 4. Clamping bolts 9 with clamping nuts 10 and 11 are used for this purpose.

The flow meter comprises a ceramic measuring tube 12 with two weakly formed flanges 13 and 14 of which the end faces constitute an inner portion 15 and 16 of the sealing faces formed by the sealing ring discs 3 and 4.

A housing 17 is formed by a tube 18 and two inwardly projecting flanges 19 and 20. The ends of the housing define the outer part 21 and 22 of the sealing faces formed by the sealing ring discs 3 and 4. The tube 18 has such a wall thickness and is so connected to the flanges 19 and 20 that the housing 17 has at least the same pressure resistance as the ceramic measuring tube 12. The connection between the tube 18 and flanges 19 and 20 is effected by welding, adhesion or a pressure fit, possibly by using additional sealing rings to result in a pressure tight joint. Between the peripheral faces of the inwardly directed flanges 19 and 20 as well as the outer flanges 13 and 14 of the measuring tube 12 there is a circumferential seal 23 and 24 in the form of two O-rings. Alternatively, there can be some other seal provided for example by putty, adhesive or a pressure fit. A hollow space 25 remaining between the measuring tube 12 and housing 17 contains pole shoes 26 and 27 which abut the measuring tube 12 from opposite sides, as well as associated coils 28 and 29. The tube 18 of the housing forms the yoke, i.e. the magnetic return path of the magnet system. The remaining free space of the hollow space 25 is filled with a sealing mass 30. Two measuring electrodes, of which only the electrode 31 is illustrated, are disposed in an axis which is perpendicular to the plane of symmetry of the pole shoes 26 and 27. The leads to the coils 28 and 29 and to the measuring electrodes extend through pressure tight fittings of which the fittings 32 and 33 disposed circumferentially between the pole shoes 26 and 27 are illustrated in a position that is offset from their actual position.

When clamping the flow meter 1 between the flanges 5 and 6, a seal is produced not only in the region of the inner part 15 and 16 of the sealing face but also in the zone of the outer part 21 and 22 of the sealing face, even though the inner sealing face forms the main seal because the end face of the measuring tube 12 projects somewhat, for example 1 mm, axially beyond the end face of the housing 17. Should the ceramic measuring tube 12 break for some reason, the flow medium can penetrate into the hollow space 25. However, the housing 17 forms a tight capsule which is sealed from the outside at both ends by the series disposition of the circumferential seals 23, 24 and the outer part 20, 21 of the sealing face. For this reason, the flow medium in the hollow space 25 cannot reach the outside. Even in the case of aggressive media, this protection suffices to enable replacement of the flow meter because the housing, which maybe of steel, has an adequately long service life.

As soon as the medium penetrates the hollow space 25, the magnet system is influenced. The measuring signal will change characteristically so that the error can be recognised rapidly.

What is claimed is:

1. An electromagnetic flow meter, comprising, a tubularly shaped ceramic measuring tube, tubularly shaped housing means surrounding said measuring tube in spaced relation thereto to provide a hollow space therebetween, a pole shoe and coil arrangement of a magnetic system mounted in said hollow space in operable relation to said measuring tube, said measuring tube having two radially outwardly projecting flanges at opposite ends thereof, said housing means having radially inwardly projecting flanges with surface in radial aubtting and sealing engagement with surfaces of said tube flanges, and annularly shaped sealing disks provided at both ends of said tube and housing means in axially abutting and sealing engagement with said tube and said housing means to form a pressure tight capsule, there being circumferential seals provided between said abutting tube and housing flange surfaces.

2. A flow meter according to claim 1 characterized in that the ends of said measuring tube extend axially somewhat beyond the corresponding ends of said housing means.

* * * * *